Jan. 23, 1934.          F. L. SCHORNO                1,944,814
                AUTOMATIC BRAKE TORQUE EQUALIZER
                     Filed Oct. 1, 1932        3 Sheets-Sheet 1
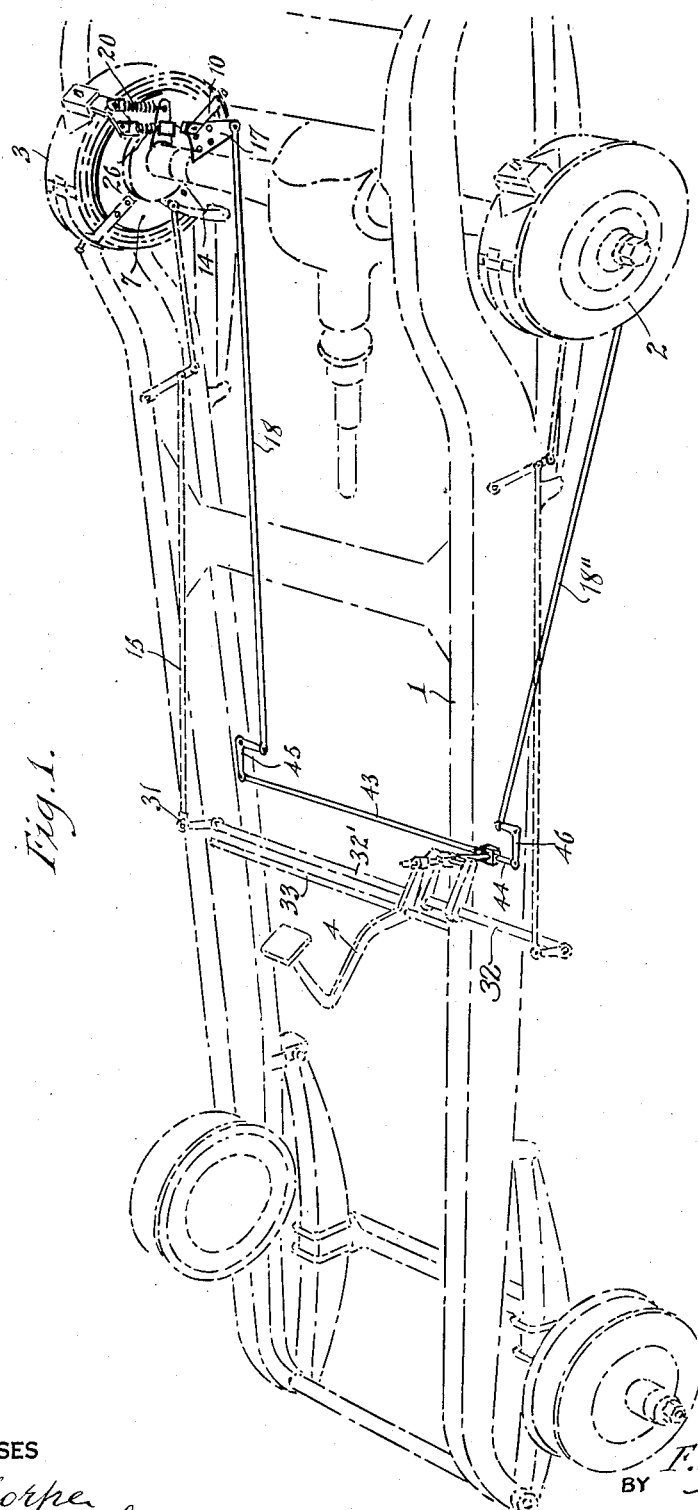
WITNESSES
INVENTOR
F. L. Schorno
BY
ATTORNEY Jan. 23, 1934.  F. L. SCHORNO  1,944,814
AUTOMATIC BRAKE TORQUE EQUALIZER
Filed Oct. 1, 1932  3 Sheets-Sheet 2
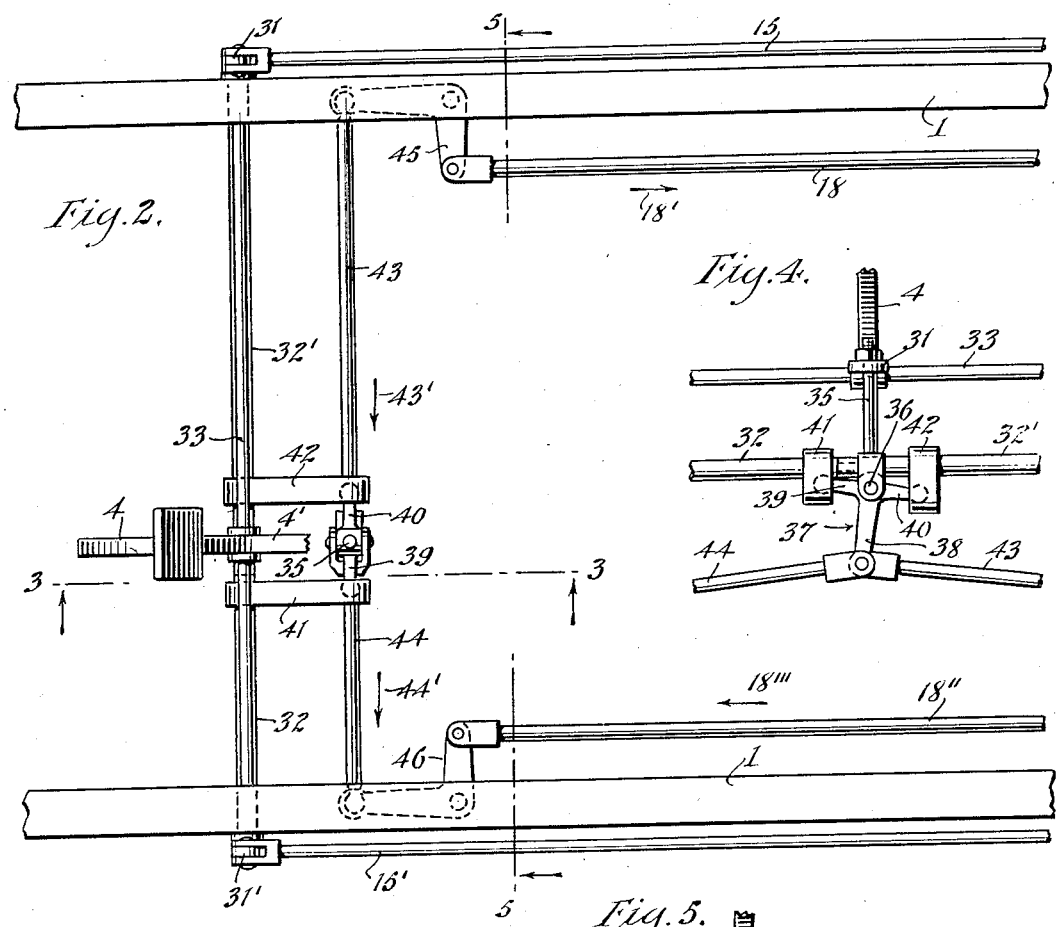
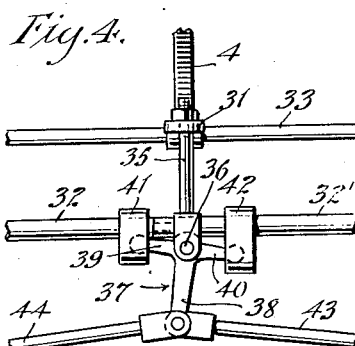
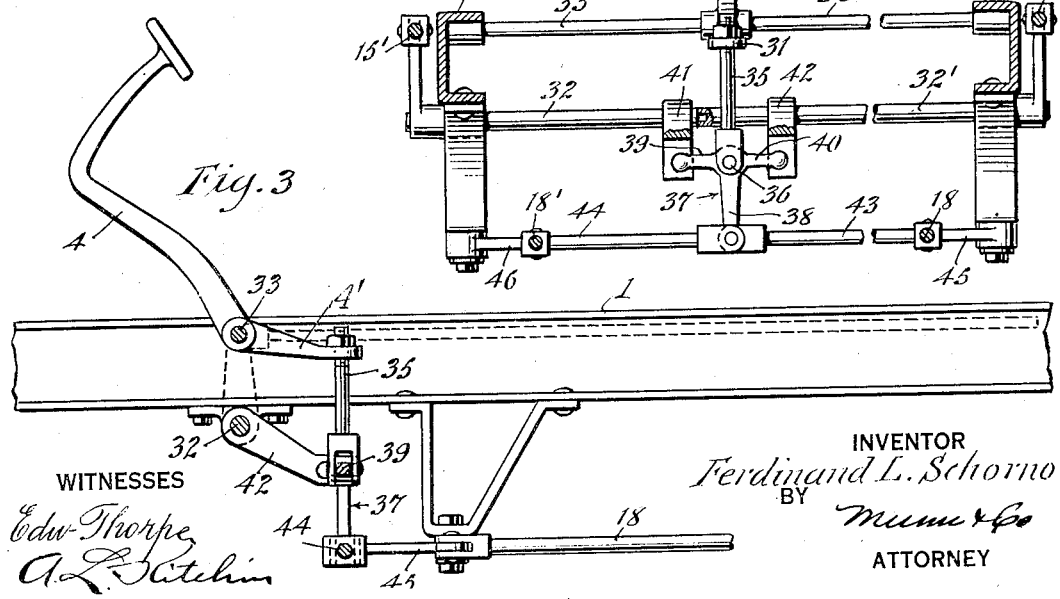
INVENTOR
Ferdinand L. Schorno
BY
Munn & Co
ATTORNEY
WITNESSES
Edw Thorpe
A L Ritchie Jan. 23, 1934.  F. L. SCHORNO  1,944,814
AUTOMATIC BRAKE TORQUE EQUALIZER
Filed Oct. 1, 1932  3 Sheets-Sheet 3
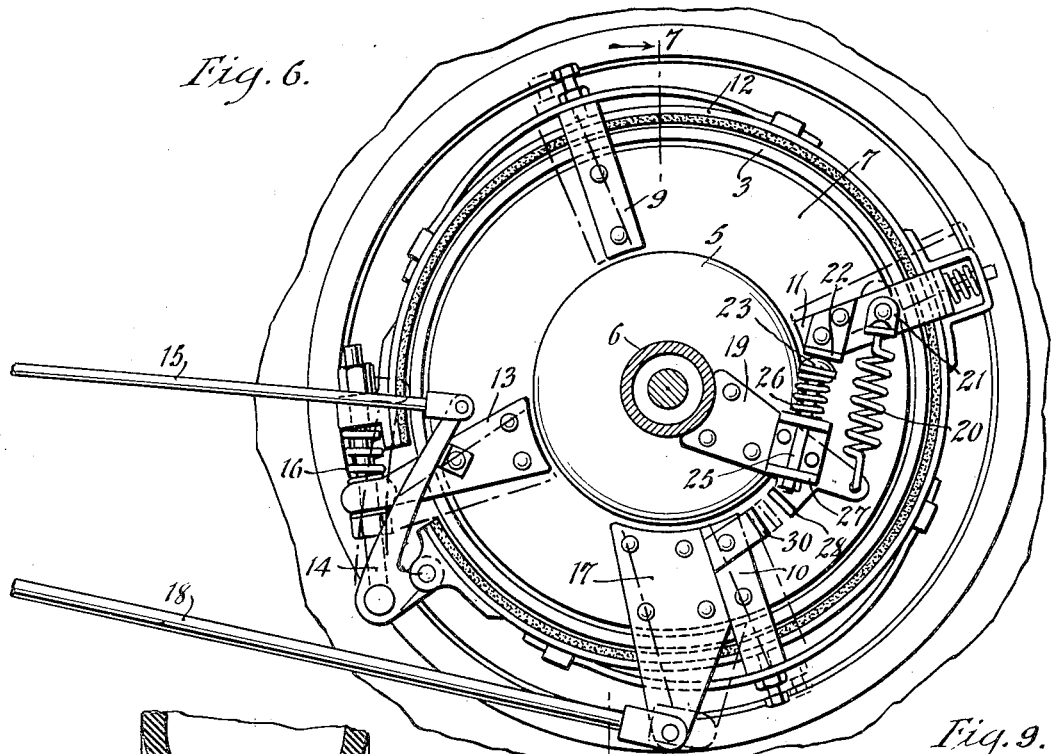
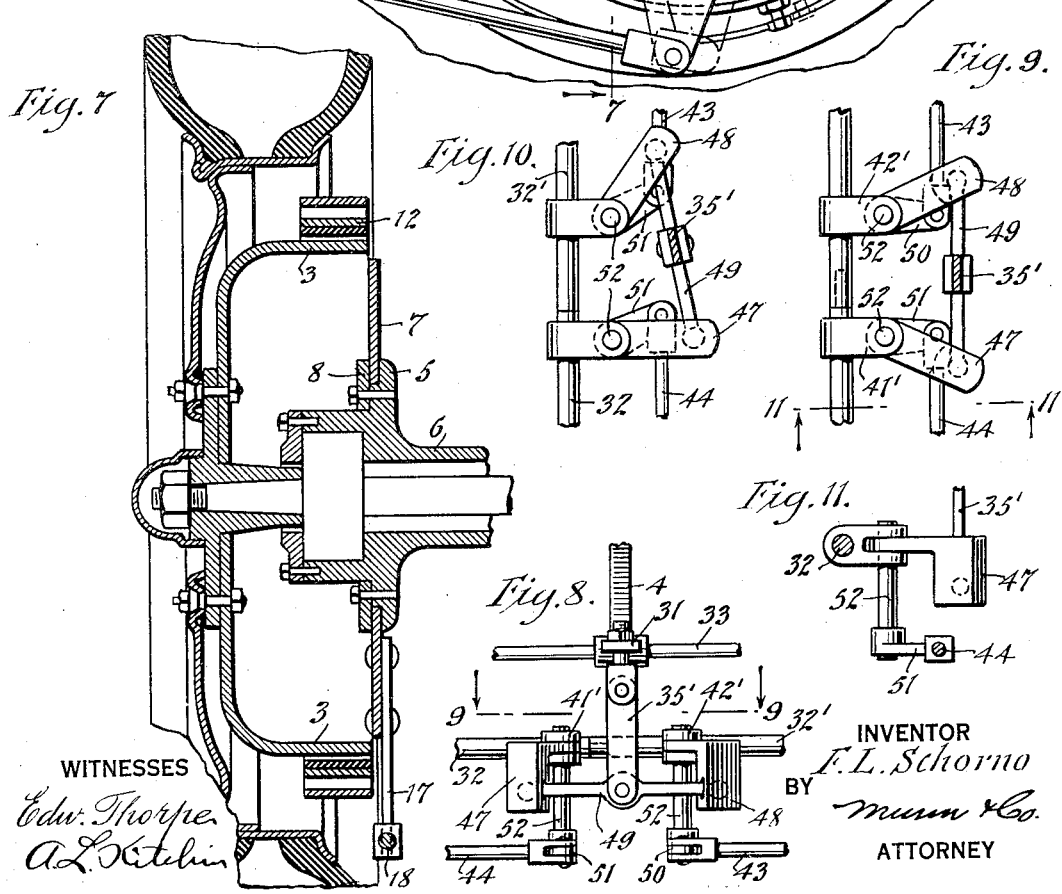
INVENTOR
F. L. Schorno
BY
Munn & Co.
ATTORNEY
WITNESSES
Edw. Thorpe
A. L. Kitchin Patented Jan. 23, 1934

1,944,814

UNITED STATES PATENT OFFICE 1,944,814

AUTOMATIC BRAKE TORQUE EQUALIZER

Ferdinand L. Schorno, Delawanna, N. J.

Application October 1, 1932. Serial No. 635,823

8 Claims. (Cl. 188—2)

This invention relates to equalizing devices for automobile braking systems, and particularly to an improved automatic brake torque equalizer, the object being to provide a structure which is simple in its construction and readily adapted to brakes now in common use.

Another object of the invention is to provide an improved automatic torque equalizer for automobile brakes wherein the action of one brake will cause the second brake to function equally.

A further object of the invention is to provide a torque equalizer for automobile brakes which may be connected to the brake mechanism now in use, so that when the brake mechanism secures a better braking action on one wheel than the other the equalizer will begin to function to apply a greater strain on the slipping or weaker brake structure to cause the same to function equally with the stronger brake structure.

In the accompanying drawings—

Figure 1 is a perspective view in dot-and-dash lines of a chassis of an automobile, together with an embodiment of the invention shown applied thereto;

Figure 2 is an enlarged fragmentary plan view of the center part of the structure shown in Figure 1, illustrating how the invention is connected with the usual brake pedal of the automobile;

Figure 3 is a sectional view through Figure 2 approximately on the line 3—3;

Figure 4 is an elevation of part of the brake pedal and certain associated mechanism;

Figure 5 is a sectional view through Figure 2 approximately on the line 5—5;

Figure 6 is a side elevation on an enlarged scale of one of the brake drums and associated mechanism shown in Figure 1, the rear axle and axle housing being shown in section;

Figure 7 is a sectional view through Figure 6 approximately on the line 7—7;

Figure 8 is a view similar to Figure 4 but showing a modified form of the invention;

Figure 9 is a sectional view through Figure 8 approximately on the line 9—9;

Figure 10 is a view similar to Figure 9 but showing the parts in a different position;

Figure 11 is a sectional view through Figure 9 approximately on the line 11—11.

Referring to the drawings by numerals, 1 indicates a chassis of an automobile which may be constructed in any desired manner, and which is provided with brake drums 2 and 3 connected in the usual manner with the wheels of the automobile. Associated with these brake drums is the usual brake pedal 4 and also the usual brake mechanism now in common use, illustrated somewhat in Figures 6 and 7, as well as in Figure 1. Only sufficient of the usual braking mechanism shall be described to make clear the functioning of the invention.

From Figures 6 and 7 it will be seen that the housing 5 is an integral part of the axle casing 6 and this housing carries a ring or disc 7 which is held rotatable on the housing 5 by the ring 8. The ring 7 carries the usual brackets 9 and 10 and 11, said brackets being riveted or otherwise rigidly secured to the ring 7. These brackets are of the usual construction and act in the usual way to hold the brake band 12 away from the drum.

As drum 2 and associated parts are identical with drum 3, a description of this drum and associated parts will apply equally to drum 3 and associated parts. The parts just described are old and well known, except rotatable disc 7, and form no part of the present invention except in combination. In addition, the bracket 13 is of the usual construction now in common use, the same coacting with the usual bell crank lever 14 and brake pull rod 15. This construction, together with the spring 16 and associated parts, are all old and well known and function in the usual manner when the brake is applied, whereby the brake band 12 is constricted so as to grip to a greater or less extent the drum 3. If the parts function properly there will be a desired gripping action, and, consequently, a desired braking action. However, when one of the brake drums 2 or 3 is slippery, or when one grips better than the other, the result will be an unequal braking action. Consequently more work will be done by one wheel in stopping the automobile than by the other. This is hard on the working parts as well as hard on the tires, in addition to allowing the car to move a greater distance before stopping. The best results are secured when both braking structures function identically and when there is the same retarding effect on both wheels, thus eliminating skidding due to an even braking action.

To secure this result where one brake performs better than the other is the underlying object of the present invention. To secure this result, mechanism has been provided which is added to the usual brake mechanism of the automobile to cause the power to be exerted more on one brake than on the other, and, consequently, to cause both structures to evenly retard their particular wheels.

In securing this result the ring 7 is made loose or so that it will rotate, and has an arm 17 riveted or otherwise rigidly secured thereto (see Figure 6). To this arm a rod 18 is pivotally connected. In addition, from Figure 6 it will be seen that a bracket 19 is riveted or otherwise rigidly secured to the housing 5 and is consequently stationary at all times. A retractile spring 20 is connected at one end to the outer end of bracket 19, and at 21 to the bracket 11. Bracket 11 is provided with an abutment 22 which is adapted to press against the head 23 of bolt 25, which bolt is surrounded by the compression spring 26 and also extends through suitable guides 27 carried by the bracket 19. When the brake band grips the drum the band and associated parts will attempt to rotate with the drum, and in doing so will stretch the spring 20. When the brake is released the spring 20 pulls the parts back to substantially the position shown in Figure 6, whereupon the abutment 22 strikes the bolt head 23 and stops any appreciable further movement. As an emergency stop in case the rod 18 should become broken, there are provided abutments 28 and 30, abutment 28 being integral with or rigidly secured to bracket 19, and abutment 30 being preferably rigidly secured to bracket 10.

The structure just described is associated with the respective drums 2 and 3 and also with the brake pedal 4. From Figures 2 to 5 inclusive the association of the parts with the pedal 4 will be seen. From these Figures it will be noted that the rod 15 is connected to the end of lever 31 which lever is rigidly secured to the rod 32'.

It will, of course, be understood that the lever 31' is also rigidly secured to rod 32 and is adapted to operate the rod 15' in the same manner as rod 15. These structures just described are old and well known and are operated by the brake pedal 4 which is journaled on a suitable rod 33 carried by the chassis 1. The brake pedal 4 is provided with an extension 4' through which the adjustable rod 35 extends, said rod at the lower end being pivotally connected at 36 with a T-shaped lever 37, said lever having a long arm 38 and short arms 39 and 40. Arms 39 and 40 have their ends slidingly mounted in the bifurcated ends of levers 41 and 42, said levers being rigidly secured respectively to rods 32 and 32'. The only new features of the parts just described is the long arm 38, as arms 39 and 40 and levers 41 and 42 are old and well known. The bifurcated levers 41 and 42, as shown in Figs. 3 and 5, permit the ends of arms 39 and 40 to slide and move as desired according to the strain exerted on their respective members. As shown particularly in Fig. 5, shaft 32' has a socket in one end and shaft 32 has a projection rotatably fitting in the socket whereby shafts 32 and 32' may independently rotate.

The structure just described acts to equalize the pull on the respective brake bands 12, but does not equalize the gripping action. By the structure just described, if there is a hundred pound pull, the same pressure will be on both brake bands, but if one band is slippery it will not grip while the other will grip properly. Arm 38 and associated parts have been designed to shift the pressure from the gripping band to the slipping band so as to cause a greater pull on one band than on the other. When one band is slipping the T-shaped lever 37 will swing, for instance, to the position shown in Figure 4 and in doing so both the rods 43 and 44 will be moved to the left as shown in Figure 4.

This action is caused by one band gripping more than the other. As illustrated in the drawings, the band 12 on the drum 3 is the one that grips and consequently will follow the drum as far as possible. In rotating with the drum the bracket 17 will be moved as, for instance, to the dotted position shown in Figure 6, and will pull rod 18. As rod 18 is pulled in the direction of the arrow 18', as shown in Figure 2, the bell crank lever 45 will move the rod 43 in the direction of the arrow 43', as shown in Figures 2 and 4. This pulling action by the rotation of the brake band just described will also move rod 44 in the direction of the arrow 44' and move the bell crank lever 46 so as to move the rod 18'' in the direction of the arrow 18'''. This will give an extra pull on bracket 17 of the brake drum 2 and, consequently, will cause the brake band 12 and associated parts of this braking structure to function in a more efficient manner, namely, to grip tightly the brake drum. This construction compensates or shifts the power from the brake pedal 4 so that there will be an equal torque by each brake drum, although on a good drum and brake band the gripping action will not be as great as the gripping action on a slippery band.

From the structure set forth it will be seen that if both brake shoes or bands grip at the same time and with the same efficiency, the bracket 17 on both braking structures 2 and 3 will remain stationary and there will be an even braking action on the respective wheels. However, if the brake band on drum 3 acts in the usual efficient manner and the brake band on drum 2 slips somewhat, then bracket 17 will move rearwardly as in Figure 6 as it rotates with the drum, and the same bracket on drum 2 will move forwardly, thus causing the bell crank lever 14 and other parts to produce a greater clamping or squeezing action on the brake shoe, thus securing the same torque or retarding effect on the brake drum as is secured on the properly operating brake structure. While one brake band grips with a greater force than the other because of the slippery action thereof, the same retarding effect is secured because since the slippery drum begins to take hold the rotation of the bracket 17 and associated parts on the good side will begin to slow down until an even balance results so that there will be the same braking action on both wheels, although a different gripping action on the respective drums. When the plate 7 is rotated due to the torque equalizing mechanism the position of the pivot of lever 14 will be slightly changed and this action will be transmitted to the lever 31, and in turn to shaft 32'. This will move the lever 42 slightly and the arms 39 and 40 will slide slightly in the levers 41 and 42, thus compensating the action of the plate 7.

In Figures 8 to 11 inclusive a slightly modified structure is shown with respect to the way the parts are connected to the brake pedal 4. In this form of the invention the levers 41' and 42' are provided with extensions 47 and 48 which are pivotally connected to the levers 41' and 42'. Instead of having a T-shaped lever as indicated by the numeral 37 in Figure 5, a straight bar 49 is used and mounted on the extensions 47 and 48 in the same way as the arms 39 and 40 on lever 37 are mounted. The rods 43 and 44 are connected to arms 50 and 51, which in turn are rigidly secured to the respective pins 52 and 53, which pins are rigidly secured to extensions 47 and 48. By reason of this structure, when either of the rods 43 or 44 are pushed there will be a corresponding movement of all the parts as, for instance, to the position shown in Figure 10. This will move one end of bar 49 nearer the respective rods 32 and 32' than the other end, so that the lifting member 35' which acts the same as the member 35 shown in Figure 3 will exert a greater movement and longer leverage on one end of bar 47 than the other, thus giving a greater power to the brake shoe connected therewith. It will be noted that in this form of the invention a greater movement and longer leverage is given one brake shoe than the other, namely, the brake shoe which slips, so that it will eventually secure the same gripping action as the one that does not slip, thus the retarding action on both wheels will be the same.

The rotation of the brake band disc of drum 2 in an opposite direction to its respective drum will pull on rod 15' and cause the band to grip the drum, at the same time long arm 38 in its movement towards the arrow 44'', Fig. 2, forces short arm 39 to raise lever 41, thus increasing greatly the pull on rod 15', also at the same time short arm 40 tends to push lever 42 down thus decreasing the pull on rod 15 as the slippery band begins to grip. It will be seen that by this action the good band cannot brake more than the slippery band because it depends on said slippery band to take hold of its drum before it can brake properly itself.

It will be noted that the device has been shown as applied to the two rear wheels of an automobile only, but by suitable adjustment it can be applied to the four wheels of a regular four-wheel system without departing from the spirit of the invention.

What is claimed is:—

1. In an automatic brake torque equalizer in combination with a band braking structure of automobiles, of means for varying the action of said braking structure to secure the same torque on the respective brake structures, said means including a pair of rotating rings carrying the brake bands of the respective brake structures, and a plurality of rods and lever mechanisms connecting said rings so that the movement of one ring will be transmitted to the other while the braking structure is functioning and thereby cause the rotary movement of one brake structure to be communicated to the other brake structure for causing the same torque on both brake structures.

2. The combination with the braking mechanism of an automobile provided with a brake drum for each wheel of the automobile to be acted upon by the brake mechanism, a brake shoe for each drum, a brake pedal and connecting mechanism for connecting the pedal with the respective brake shoes for causing the brake shoes to grip their respective drums, of a rotatable ring mounted near each of said drums, means for supporting the respective brake shoes on the respective rings, a bracket connected with each ring, a rod pivotally connected with each bracket, and lever mechanisms connecting the respective rods with said brake pedal so that when one of the brake shoes grips its drum and the other does not, the gripping brake shoe is caused to rotate with its drum and move the ring associated therewith together with the bracket and rod connected with the ring whereby movement is transmitted to the opposite ring and brake shoe for moving the same a sufficient distance to secure sufficient movement thereof to produce the same torque as is produced by the gripping brake shoe.

3. The combination with an equalizing braking system for the rear wheels of an automobile, including an equalizing T-lever, of means for producing an equalized torque on the respective drums of the respective wheels to receive the braking action, said equalizing means including a pair of rods pivotally connected to one of the arms of said T-lever, bell crank levers connected to the end of said rods, a pair of shift rods connected to said bell crank lever, a bracket connected to each of said shift rods, a rotatable ring rigidly secured to each of said brackets, and means carried by the respective rings for supporting the respective brake shoes adjacent said drums, said rings being rotatable independently of said drums and rotatable with the drums when the brake shoes grip the same, said brake shoes rotating a short distance in the direction of rotation of the drum when the brake shoes are in functioning position, whereby if one brake shoe slips the opposite brake shoe, ring and bracket associated therewith will grip and rotate a further distance and consequently will shift said various rods and bell crank levers including said T-lever so that more power will be applied to the slipping brake band than the other and consequently the same torque will be produced on the respective brake drums.

4. In an automatic brake torque equalizer for automobile braking mechanisms, including a pair of brake drums, a brake band associated with each drum and means for causing the brake bands to grip the respective drums, of a rotatable ring for each of the brake bands acting to support the same, a bracket extending from each ring, said brackets being rigidly secured to said rings, and means for transmitting power from one bracket to the other as the same is rotated with the ring so as to equalize the torque exerted on the respective drums.

5. A torque equalizer for automobile brakes having a pair of brake drums, a brake band for each drum and means including a foot pedal and an equalizing mechanism for equalizing the pressure from the foot pedal, including a rotatable ring for each drum acting to support the respective brake bands, a bracket secured to each of said rings, springs associated with each of said rings for normally holding the rings in a given position, said rings being adapted to rotate with the drum for a short distance against the action of said springs when the respective brake bands are functioning, and a lever mechanism connected with said brackets, said lever mechanism being connected together with said equalizer structure for causing a greater movement of one of said brake bands than the other when one band slips whereby a substantially equal torque is secured on the respective drums.

6. In an automatic brake torque equalizer, a rotatable ring, a spring for normally holding the ring in a given position, a bracket rigidly secured to said ring, and a lever mechanism adapted to be operated by said ring so as to transmit power from the ring as the same rotates.

7. The combination of an automatic braking mechanism for the rear wheels of an automobile, said braking mechanism including a brake drum for each wheel, a band for each brake drum, a foot pedal, and means for connecting the respective bands with the brake pedal so that as the foot pedal functions the bands will be constricted to grip the respective drums, said mechanism including an equalizing structure comprising a lever mechanism, a rotatable ring arranged adjacent each of said drums, a bracket rigidly secured to each of said rings and pivotally connected with the respective opposite ends of the lever structure so that the rotation of one ring will be communicated to the other ring and will shift said equalizing mechanism so that power produced by the actuation of said brake pedal will be applied to a greater extent on one brake band than on the other.

8. The combination with a braking system having an automatic equalizing structure, of means for shifting the equalizing structure so as to exert a greater pull on one part of the braking structure than the other, said means including a ring for each braking structure adapted to be rotated thereby, a rod for each of said rings adapted to be reciprocated thereby, a bell crank lever connected with each of said rods, and means for connecting the bell crank lever with said equalizing structure for shifting the same from a central position when one of said rings rotates more than the other, whereby more pressure will be brought on one braking structure than the other in order to secure an equal torque throughout the braking system.

FERDINAND L. SCHORNO.